Nov. 27, 1962  E. L. McKENZIE  3,065,559
DECORATIVE REFLECTIVE SHEETING
Filed Oct. 15, 1958

INVENTOR
EUGENE L. McKENZIE
BY
Carpenter, Abbott, Coulter & Kinney
ATTORNEYS

3,065,559
DECORATIVE REFLECTIVE SHEETING

Eugene L. McKenzie, North St. Paul, Minn., assignor to Minnesota Mining & Manufacturing Company, St. Paul, Minn., a corporation of Delaware
Filed Oct. 15, 1958, Ser. No. 767,400
10 Claims. (Cl. 41—22)

This invention relates to unitary decorative sheeting having a smooth easily-cleaned front face and exhibiting diverse optical properties. The invention also relates to a method for making such novel sheeting.

Sheeting of this invention is particularly adapted for use in forming medallions and other decorative insignia and panels for automobiles, household appliances, etc., where configurative beauty in combination with a luxurious surface appearance is needed to attract the eyes and attention of an observer.

A characteristic of my sheeting is that it is thin, yet appears to be relatively thick when viewed from its front face after being mounted in a flat position. Preferably my sheeting is flexible, but it appears to be rigid and unbendable when mounted in use applications. Diverse types of light reflection in different areas of my sheeting give an observer the impression that there is a three-dimensional pattern molded in the sheeting, and that the apparent pattern of the sheeting is more deeply embedded therein than it actually is. Depending upon the angle at which my sheeting is viewed, light conditions remaining unchanged, the apparent pattern in the sheeting appears to become altered. For example, at different angles of viewing, the apparent pattern may appear darker or lighter than other areas of the sheeting, suitably termed "background" areas, even when the same color dye, at a uniform concentration per unit of area, is used throughout the length and width of the sheeting.

Under usual daytime lighting conditions, the preferred embodiment of my sheeting presents a high luster or glossy appearance, mirror-like in quality, with a pattern therein causing diffuse reflection of light. At angles near normal to such sheeting, the pattern usually appears darker than the specular-reflecting areas surrounding each element of the pattern. At various angles to the normal, however, such sheeting may appear generally smooth and shiny, with a pattern appearing as flecks or patches of bright specularly reflected light. Under special conditions, such sheeting may even appear to be brilliantly "alive" with a pattern of light reflection, even though the only source of light is near the eyes of a viewer and the angle of incidence of the light upon the sheeting is other than normal. Under still other conditions, e.g., at extremely large angles to the normal, such sheeting may simply present a smooth shiny luxurious apperance.

The specular-reflecting areas of the foregoing embodiment of my sheeting may be replaced, in whole or in part, by diffuse-reflecting areas having a smooth flat mat appearance, or by semi-specular-reflecting areas such as formed using a layer of metal flakes. In combination, the various types of light reflection exhibited by my sheeting contribute to the beauty and luxury of its appearance, serving frequently to intrigue the viewer and hold his attention.

One of the major benefits of this invention is that now, for the first time insofar as I am aware, all of these varied light-reflecting characteristics are attained in a single thin unitary sheet material which, advantageously, presents a smooth front surface for easy cleaning, and which also can be cut to various sizes and still withstand severe weathering environmental conditions for lengthy periods without substantial deterioration.

The combination of specular reflection (or a smooth mat or a semi-specular finish) with reflex reflection (or coarse diffuse reflection) to form a unitary, smooth-surfaced, easily-cleaned sheet article of surprisingly high resistance to deterioration by weathering has heretofore, insofar as I am aware, been an insurmountable problem to which no ready and practical solution has presented itself. My invention not only provides the art with such novel sheeting, but a practical and economical method for making the same. Articles of this invention are formed without any necessity for employing expensive grooving, molding or die-forming techniques as used in the fabrication of conventional prior art "see-deep" structures. Using my novel method of fabrication, hot-press die costs are avoided, continuous manufacture is possible without repeated hand operations, and considerable economy of production is thereby gained. In my process, a pattern is "embossed" in the sheeting by using in situ "die" elements and these "die" elements contribute to the novel light reflection characteristics of the final article.

My invention will further be described in connection with an illustrative drawing, made a part hereof, wherein.

Figure 1:
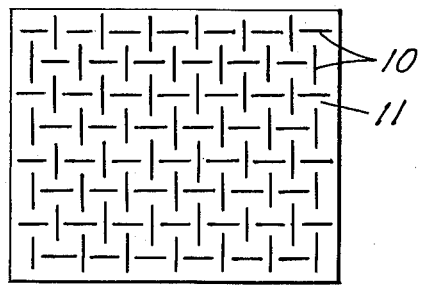
FIGURE 1 is a schematic front elevation of the face of a sheet article hereof.

As schematically illustrated in FIGURE 1, a pattern of many spaced-apart design elements 10 is apparent from the front face of the sheet material. The elements 10 may be of varied over-all shape, but each is discrete and separate from the others in the sheet material. Under daylight conditions, elements 10 provide for diffuse reflection characteristics in the sheet material. Each element 10 is surrounded, in the preferred embodiment of my invention, by a continuous specular reflection area 11 extending substantially throughout the sheet.

Figure 2:
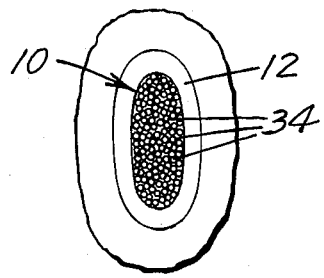
FIGURE 2 is an enlargement of a fragment of FIGURE 1.

As illustrated in FIGURE 2, elements 10 are formed of a plurality of small glass beads 34, and, in the preferred embodiment, each element 10 has thereabout a limited specular-reflection "bridging" area 12, to be hereinafter more fully explained.

Figure 3:
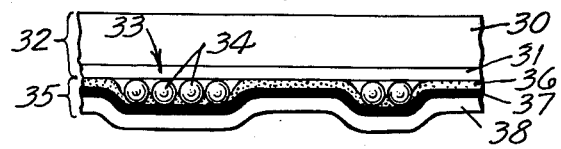
FIGURE 3 is a schematic cross-sectional view of a portion of a sheet article hereof.

Proceeding now to the cross-sectional view in FIGURE 3, my sheet material includes a handleable self-supporting layer of non-fibrous transparent weather-resistant material 30, which suitably may be a sheet of polymethyl methacrylate, polystyrene, cellulose acetate butyrate, polyethylene terephthalate, glass plate, etc., usually at least 2 mils thick for durability and wear protection, but not more than about 100 mils thick so as to avoid any significant detraction from desired optical properties in the sheet. This transparent layer is preferably essentially uniformly thick and semi-stiff in character. It is dimensionally stable, retaining its structural shape in handling. It can withstand bumps and impacts on its surface without rupturing or becoming badly dented, but it is preferably sufficiently flexible to be relatively easily bent without cracking, to conform to curved surfaces and panels.

If desired, the transparent weather-resistant layer may be so formed so as to have transparent coloring matter (e.g., phthalocyanine colorants, finely divided yellow ferric hydroxide, etc.) distributed uniformly throughout the layer; but most frequently, it is convenient to employ a separate transparent color layer, as at 31, to impart color to the sheeting, either as a complete entity or in a suitable color pattern. Suitable transparent color layers may be formed using such transparent colorants as phthalocyanine green, phthalocyanine blue, various vat dyes, etc. Some transparent color coatings may even be applied over the top surface of the transparent weather-resistant layer, where durability, glossy sheen, and weather-resistance are factors which can be sacrificed to a partial extent.

Beneath the face sheet 32 (which includes the transparent weather-resistant layer and any optional transparent color layer or layers), are several discrete groups 33 of small spherical glass beads 34 (see FIGURE 3). These groups under daytime lighting conditions serve as the diffuse-reflecting design elements 10 referred to above. In practice, the glass beads of these groups are bunched together in essentially a monolayer (which is graphically illustrated in FIGURE 3), with the total area of the monolayer of each group being relatively minute in relation to the size of the sheet material itself. The area of coverage of the glass beads in a group here discussed does not stretch out in any one direction beyond a length which would be deleterious to weather-resistance or beauty of the sheet article, should the group be cut through in the fabrication of the sheeting into a decorative panel. In practice, this means that the longest dimension of a group is not more than about ¼ inch. Each group is completely encapsulated and separated from other groups in the sheeting, usually by a distance at least equal to the smallest dimension of the group. The shape and pattern of these groups or design elements may, of course, vary greatly. Generally, the most desirable combination of optical properties occur where the total area of all the groups in a given unit area of sheeting is no more than half the area of the given unit.

Curved around the rear extremity of each discrete group 33 is a flexible and stretchable laminated structure 35. In the preferred embodiment of the invention this structure includes an adhesive layer 36 (which preferably is a water-insoluble rubbery-base pressure-sensitive adhesive layer), a visibly-continuous specular-reflecting layer 37, and a thin tough protective resinous layer 38. Sometimes it is desirable to interpose a thin flexible transparent color layer between the specular-reflecting layer 37 and adhesive layer 36; such a variation of structure, as well as others which will readily occur to those skilled in the art after becoming familiar with this disclosure, is well within the scope of the invention here contemplated.

As illustrated in FIGURE 3, the laminated structure 35 is, in toto, stretched about the rear extremity of each discrete group 33 of glass beads 34, and pressed into contact with the face sheet structure 32 in all areas around groups 33.

The enlarged fragment of FIGURE 3 illustrates details of the relationship of the glass beads 34 to other portions of my sheet material. As may be observed by referring to FIGURE 4, the specular layer 37 of the sheet structure "bridges" from the rear extremity of the group of glass beads 34 toward the rear surface of the face sheet 32. In other words, it is embossed towards the face sheet 32 in areas around the group of glass beads 34. The specular layer 37 lies essentially flat against the face sheet in areas between the groups 33 (see FIGURE 3). It will be noted that specular layer 37 is, in a sense, gracefully curved from the rear extremity of groups 33 (consisting of beads 34 in FIGURE 4) to the rear of the face sheet 32. The curved portion is the bridging area and is designated 39 in FIGURE 4, and 12 in FIGURE 2. Viewed at various angles around 45 degrees from normal to the surface of my sheet structure, the bridging areas on the farther side of each group 33 tend to appear brighter or lighter in color under normal daytime conditions than the remainder of the sheet, even when a uniform color layer is employed as at 31. This is believed to be due to specular reflection from such bridging portions of the specular layer. In effect, a variety of specular reflection characteristics are gained from these different planes of bridging specularity in my preferred structure. Note that in the bridging areas, the "planes" of specularity are at angles to the surface of the structure.

Formation of the sheeting of this invention is accomplished in a surprisingly simple and economical manner by what may be called a "printing" and "embossing" technique. The laminate 35 is printed on its adhesive side with a pattern formed of small glass beads. The glass beads may be opaque or transparent, colored or clear, coated or free of any coating, depending upon the final optical effects desired. They are pressed slightly into the adhesive layer in printing, and are firmly anchored therein, but protrude at least a small distance above the surface of the adhesive layer. It is essential that the glass beads protrude from the adhesive layer a short distance, preferably about one-half the distance of their average diameter. In practice, this is usually accomplished by employing glass beads which have a diameter about twice as great as the thickness of the adhesive layer. Since the adhesive layer generally should not exceed about 1 mil or 25 microns thickness for proper functioning as an adhesive bond (but can vary in thickness), beads in the range of about 20 to 100 microns in diameter have been found most suitable for the attainment of the combination of optical properties aforediscussed. However, beads of larger diameter, up to about 10 mils, may be used with success for coarse textured effects. Batches of glass beads tend to contain beads of varying diameter; but it is preferable to employ batches where the beads do not vary greatly in size, i.e., where 90% of the beads (exclusive of the 5% largest and 5% smallest) lie in a range where the largest of the 90% fraction are no more than about twice the diameter of the smallest of the fraction. It will be appreciated that "glass beads" as used herein includes beads not only of inorganic constituents but also of organic or plastic composition.

For the most outstanding combination of optical properties in my sheet material, glass beads are used which are transparent and either intrinsically reflex-reflecting (e.g., transparent glass beads hemispherically coated with a reflective pigment or metal layer), or easily converted into intrinsically reflex-reflecting elements. Preferably printing is accomplished using transparent glass beads with a continuous, extremely-thin, specular metal layer thereabout. Following printing, the exposed portions of the metal coating of such beads is removed (leaving a hemispherical cap on the rear of the beads as illustrated at 40 in FIGURE 4) prior to adhesively securing the printed laminate to the rear face of the semi-rigid structure-retaining face sheet 32. During assembling of the printed laminate to the rear surface of the face sheet, the laminate is smoothly stretched about the rear and sides of the groups of beads, forming a cup-like pocket for each group. The stretched laminate is then fastened adhesively in essentially continuous manner to the rear surface of the face sheet in areas between the bead groups. Suitably, "embossment" of the laminate as well as adhesive attachment of it to the face sheet is accomplished by passing a lay-up of the face sheet and printed laminate between pressure squeeze rollers. The glass-beaded design elements of the structure thus serve as embossing elements in the manufacture of the product as well as providing optical design elements in the final product.

In the resulting structure, the glass beads behind the face sheet are in tangential contact with the face sheet, with a pocket of air between the face sheet and the adhesive in the area where the beads are located. The pocket of air is actually a labyrinth of air, and the beads, in effect, each have an adjacent field of air about their points of tangential contact with the face sheet (i.e., an adjacent field of air about interfacial contacts between the face sheet and the glass beads). Thus, the front approximately hemispherical portion of each glass bead is surrounded by air except for its point of tangential contact against the face sheet, whereas the rear approximately hemispherical portion of each spherical element is embedded in the adhesive layer. Minor variations of this exact arrangement are possible without upsetting the optical properties aforedescribed. Indeed, the elements are so minute that unavoidable variations in size inherently effect minor variations in the relationships noted.

Figure 4:
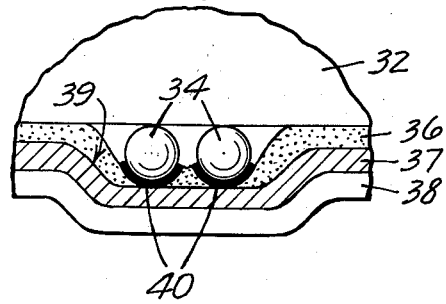
FIGURE 4 is an enlargement of a fragment of FIGURE 3.

For brilliant reflex reflection, transparent glass beads having a refractive index ($n_D$) of at least 1.7 up to about 2.0 should be used; but transparent glass beads of even higher refractive index may be used to gain suitable reflex reflection where appropriate principles are employed as well understood in the art of reflex reflection. In FIGURE 4, a well-known reflex-reflecting optical element is illustrated consisting of transparent glass beads 34 provided with thin metallic hemispherical coatings 40 about their underlying or rear extremity. Reflex reflection, as used herein, refers to the ability of a sheet material to reflect an incident beam of light in a brilliant cone having its axis essentially common with the incident beam, even though the incident beam strikes the sheet material at an angle other than normal. While design elements 10 of reflex reflecting properties are preferred, the invention is by no means limited solely thereto.

As noted in the drawing, the portions of the laminate between groups of glass beads in the final structure is essentially parallel with the rear surface of the face sheet. Thus, each group of beads is hermetically sealed in a pocket free from atmospheric conditions. Cutting of the sheeting disrupts only a few, if any, of these pockets, preserving the majority of them in a sealed condition so that the sheeting can withstand severe environmental weather conditions without significant damage to any of its internal parts.

The following specific example is offered to illustrate the preferred sheet structure embodying the principles of this invention and a practical method for making such a structure. Unless otherwise indicated, all parts are by weight.

A low adhesion carrier web is prepared by solvent coating a mixture of 42 parts of a rubber-grade styrene monomer, 0.2 part of benzoyl peroxide, 0.2 part of ditertiary butyl peroxide, and 57.6 parts of xylene upon a smooth calendered 65 lb. paper at a thickness sufficient to leave a 1-mil thick dry sizing film after solvent evaporation. The dried coated paper is heated to 220° F. for about 5 minutes to effect polymerization and cure.

A solution of 14.5 parts polyvinyl butyral in 85.5 parts Cellosolve acetate (Monsanto Chemical Co.'s "H.V. Butvar" resin) is coated onto the sized paper carrier at a thickness sufficient to give a 0.4 mil thick back-up protective layer of polyvinyl butyral after evaporation of solvent, which is done at 180° F. for 2 minutes. The layer is then fused by heating it to 280° F. for 6 minutes.

Over the polyvinyl butyral coating is then applied an extremely thin, opaque, visibly continuous layer of aluminum, by depositing aluminum vapor from high vacuum using conventional metal-vapor deposition equipment.

A pressure-sensitive adhesive solution of methyl isamyl acrylate (i.e., acrylic acid ester of 2-methyl pentanol-4) at a concentration of 20% solids in heptane is coated over the metallic layer at a thickness sufficient to leave a dry film thickness of 1.0 mil (25 microns), and the solvent of the coating evaporated at 180° F. for 4 minutes. The structure formed by following the foregoing procedure will be referred to hereinafter as "structure A."

Silvered transparent glass beads are then distributed over the adhesive coating in a pattern consisting of a plurality of discrete groups of the beads, each group being a compact monolayer of beads, and each group being separated from the other groups by a stretch of adhesive substantially free of beads.

The beads employed were formed as follows: 300 parts of glass beads having an approximate diameter of 35–70 microns and a refractive index of approximately 1.9 are added to 1200 parts of water, followed by the addition of 12 parts of silver nitrate to the water. Then, 25 parts of ammonium hydroxide are added to the water and the contents stirred gently to gain mixing. After about 5 to 10 minutes, 10 parts of dextrose in 32 parts of water are added, and then 6 parts of potassium hydroxide in 32 parts of water are added. After the beads are opaquely silvered, which occurs in about 5 minutes, they are washed with clear water and dried.

Application of the beads in groups over the adhesive coating to prepare a design such as illustrated in FIGURE 1 is accomplished by using a wire screen transfer technique. A woven screen having wires about 0.015 inch in diameter with openings about 0.045 inch square is suitable. On the wires of the screen is formed a tacky coating by spray coating the wires with a resin film-forming solution consisting of 40 parts of a medium oil length, soya-modified, phthalic alkyd resin solids ("Beckosol HV 1307"), 6 parts of a butylated melamine-formaldehyde resin at about 55% solids concentration in a 50–50 solvent mixture of xylene and butanol, 2 parts of a cobalt napthanate drier catalyst (containing 6% cobalt as metal), 35 parts of ethyl cellulose, and 17 parts heptane. The sprayed thickness is sufficient to give, upon evaporation of the solvents, a dry coating thickness of about 0.5 mil on the wires of the screen. The solvent coated screen is dried in air about 30 minutes after the coating step so as to remove much of the solvent but leave the residual resin film tacky to the touch. The screen is passed through a hopper of loose beads at which time a monolayer of beads is lightly anchored about the wires of the screen. The screen with beads lightly anchored thereon is placed over the adhesive coated film of structure A, and both are then passed through the nip of tightly coacting rubber rollers, which serve slightly to press the beads up to about half of their diameter into the adhesive layer at points of contact between the adhesive layer and beads on the wires of the screen. The adhesive coating is more aggressive in tack than the resin, and the beads transfer from the wires of the screen to the adhesive coating during this step. Since the screen is woven, and the beads minute in size, those beads attached to the segment or portion of wires looped behind wires in the weave pattern of the screen do not come into contact with the adhesive coating and remain on the screen, whereas beads on the loop of wires adjacent to the adhesive coating transfer directly to the adhesive coating during the passage of the laminate between the rubber rollers. In other words, the contact points between the adhesive coating and patches of beads on wires of the screen are discontinuous due to the inherent nature of the weave of the screen, thus the transfer step results in the printing of a plurality of design elements of discrete bead groupings, each consisting of a monolayer of beads laterally surrounded by the adhesive layer.

An approximately hemispherical portion of the beads of each group is left protruding and/or exposed from the adhesive layer, and the silver from this portion is removed by dipping the composite structure for 10 seconds or so in a solution consisting of 96.5 parts water, 0.8 part potassium dichromate, and 2.7 parts sulfuric acid, which results in etching the silver from the exposed portions. After etching, the structure is flushed with water and dried.

The structure so formed is then removed from the sized paper carrier film and laminated with its adhesive side to a 5 mil thick transparent layer or face sheet of biaxially oriented methyl methacrylate (e.g., "Methaflex" of the Plax Corporation) by passing the combination between two pressurized rubber nip rolls. During this operation, the portion of the laminate consisting of the adhesive layer, the vapor-deposited metal film, and the back-up protective layer is permanently conformed or distorted about the bead groups and "embossed" toward the face sheet. The adhesive between the bead groups is firmly adhered to the face sheet and thus each discrete bead group is hermetically sealed from the others and from the atmosphere. The beads of each group serve as a wedge or in situ die to space the vapor-deposited metal layer (and its associated adhesive layer) from the rear surface of the face sheet. Each bead in contact with the face sheet has a hemisphere of air surrounding it except for its point of tangential contact with the face sheet.

The resulting structure has a multiplicity of angular inversions, i.e., varied planes of specular reflection, caused by the stretching or bridging of the vapor-deposited film (with its adhesive and back-up protective layer) about the peripheral areas of the bead groups toward the face sheet.

Thus the structure has an over-all metallic glitter. At cerain angles to the normal, specular reflection of light takes place from the bridging portion of the vapor-deposited film (i.e., that portion adjacent to peripheral areas of each bead group). Additionally, specular or mirror-like reflection of light occurs from the front face of the structure, as is evident by a mere glance at the front face under ordinary daylight lighting conditions. Diffuse reflection of light usually predominates under daylight conditions from the printed pattern consisting of the bead groupings, but under certain light conditions, as where the source of light is near the eyes of the viewer of the structure even though viewing takes place at an angle other than normal, brilliant retro-reflectance or reflex reflection of light is in evidence. The total effect is that of luxury and beauty with a pattern which appears to be "etched" in the structure, thus giving a three-dimensional illusion of depth to the structure.

The resulting sheet material can be wound into rolls and marketed in roll form. If desired, a coating of pressure-sensitive adhesive, heat or solvent-activatible adhesive, or other adhesive can be applied over the back side of the structure to add to the convenience of using the sheet material. Alternatively, commercial cements may be used to secure the sheeting in position on a substrate, or it may be clamped into position.

The sheeting is suitable for decorative trim on the exterior or interior of automobiles. It can be used as decorative trim for household appliances and the like, where specular and/or reflex reflectance is advantageous. Advertising novelties such as calendars, desk pads, pictures, etc., can be decorated with borders, letters, emblems, etc., using this sheeting.

The surface of the sheeting is easily cleaned, polished or waxed, without disruption of the optical properties of the sheeting.

The specular-reflecting layer of the foregoing illustrative sheeting is preferably formed by high vacuum vapor deposition of metals, for example, copper, silver, aluminum, etc., on a tough resinous back-up or protective layer as aforeillustrated. However, it is possible to employ a thin foil of luminum or the like as both the specular-reflecting layer and the protective back-up layer.

For convenience of illustration and clarity of understanding, my invention has been described by reference to the preferred embodiment of sheet material which has a specular-reflecting layer extending throughout the sheeting. As previously indicated, however, the process hereof may also be used to prepare other types of novel sheeting having unusual optical properties and relationships, but free of a metallic mirror-like or specular-reflecting layer. Thus, where a flat mat-finish exhibiting diffuse reflectance is desired in combination with both a pattern of spaced-apart design elements and a smooth flat glassy surface, I may replace the opaque specular-reflecting layer of the aforedescribed sheeting (as well as the protective layer thereof) with an opaque pigmented, low-gloss, tough, resinous reflective layer. Such a layer may be formed by coating out and drying the following mixture on a low adhesion carrier web: 9.3 parts polyvinyl butyral, 60 parts of the solvent Cellosolve acetate, 4.7 parts of an oil-modified sebacic acid ester plasticizing resin (such as "Paraplex RG 8" marketed by the Rohm & Haas Chemical Company), 18.5 parts of titanium dioxide pigment, and 7.5 parts of silica aerogel. Transparent adhesive is coated over this layer, silvered transparent glass beads "printed" thereupon, and the remaining steps of the process aforedelineated are followed to form an optical sheet having a luxurious mat finish appearance, a pattern of coarse diffuse reflectance under daylight conditions, and a smooth easily cleaned front face.

As a further alteration of the reflectance properties of the preferred embodiment of my sheeting, a layer of metal flake pigment may be used in place of the visibly-continuous vapor-deposited metal layer aforementioned, thereby to obtain a sheeting exhibiting semi-specular reflectance in areas between the spaced-apart design elements.

In all embodiments, however, there is a dimensionally-stable, weather-resistant transparent face layer, an underlying flexible and stretchable opaque light-reflecting layer, and a pattern of many spaced-apart design elements of discrete groupings of small glass beads between the two layers with the opaque layer stretched about the rear and side portions of the design elements and adhesively secured to the transparent layer in areas between the design elements. In all cases, whether the small spherical glass beads of the design elements are transparent or opaque, colored or clear, coated or free of a coating, they are hermetically sealed or encapsulated between the layers with an adjacent field of air about interfacial contacts between the beads and the transparent layer, as aforedescribed.

The foregoing detailed description of various embodiments of my invention is to be construed as illustrative, and all equivalents are fully comprehended as within the scope of my invention.

That which is claimed is:

1. A unitary decorative sheet material having a smooth front face and a three-dimensional appearance, comprising a dimensionally-stable weather-resistant transparent front sheet, an underlying flexible and stretchable specular-reflecting sheet, and a pattern of many spaced-apart design elements consisting of discrete compact groupings of small glass beads between said transparent sheet and said specular-reflecting sheet, said specular-reflecting sheet being stretched about the rear and side portions of said elements toward said transparent sheet and adhesively secured thereto in areas surrounding said elements, whereby said elements are encapsulated between said transparent sheet and said specular-reflecting sheet, the glass beads of said elements being essentially in tangential contact with the rear surface of said transparent sheet and having an adjacent field of air about interfacial tangential contacts between the transparent sheet and glass beads.

2. A unitary decorative sheet material having a smooth front face and a three-dimensional appearance, comprising a dimensionally-stable weather-resistant transparent front sheet, an underlying flexible and stretchable opaque light-reflecting sheet, and a pattern of many spaced-apart design elements consisting of discrete compact groupings of small glass beads between said transparent sheet and said opaque sheet, said opaque sheet being stretched about the rear and side portions of said elements toward said transparent sheet and adhesively secured thereto in areas surrounding said elements, whereby said elements are encapsulated between said transparent sheet and said opaque sheet, the glass beads of said elements being essentially in tangential contact with the rear surface of said transparent sheet and having an adjacent field of air about interfacial tangential contacts between the transparent sheet and glass beads.

3. A unitary decorative sheet material having a smooth front face and a three-dimensional appearance, comprising a dimensionally-stable weather-resistant transparent front sheet, an underlying flexible and stretchable opaque diffuse-reflecting sheet giving a mat finish appearance, and a pattern of many spaced-apart design elements consisting of discrete compact groupings of small glass beads between said transparent sheet and said opaque diffuse-reflecting sheet, said diffuse-reflecting sheet being stretched about the rear and side portions of said elements toward said transparent sheet and adhesively secured thereto in areas surrounding said elements, whereby said elements are encapsulated between said transparent sheet and said diffuse-reflecting sheet, the glass beads of said elements being essentially in tangential contact with the rear surface of said transparent sheet and having an adjacent field of air about interfacial tangential contacts between the transparent sheet and glass beads.

4. A unitary decorative sheet material having a three-dimensional appearance, comprising a dimensionally-stable weather-resistant transparent front sheet having a smooth front face, an underlying flexible and stretchable specular-reflecting sheet, and a pattern of many spaced-apart design elements of discrete compact groupings of small glass beads between said transparent sheet and specular-reflecting sheet, the glass beads of said design elements being essentially in tangential contact with said transparent sheet and having an adjacent field of air about interfacial tangential contacts between the transparent sheet and glass beads, said specular-reflecting sheet being deformed toward said transparent sheet and adhesively secured thereto in areas surrounding said design elements so as to encapsulate said design elements between said transparent sheet and said specular-reflecting sheet.

5. A unitary decorative reflective sheeting having a three-dimensional appearance, said sheeting comprising a dimensionally-stable weather-resistant transparent front sheet, a plurality of discrete compact groups of small glass beads in essentially tangential contact with the underlying surface of said transparent sheet and having an adjacent field of air about interfacial tangential contacts between the transparent sheet and glass beads, and an underlying flexible and stretchable specular-reflecting sheet cupped around said discrete groups and embossed toward said transparent sheet so as to produce a bridging optical effect, said bridging optical effect being formed by the bridge of said specular-reflecting sheet between the lowermost extremity of peripheral glass beads in said groups and said transparent sheet, said specular-reflecting sheet being adhesively bonded to said transparent sheet in areas between said pattern of discrete groups of glass beads.

6. A unitary decorative reflective sheeting having a three-dimensional appearance, said sheeting comprising a dimensionally-stable weather-resistant transparent front sheet of essentially uniform thickness and having a smooth polishable front face, a pattern of many spaced-apart design elements consisting of discrete groupings of small glass beads essentially in tangential contact with the underlying surface of said transparent sheet and having an adjacent field of air about interfacial tangential contacts between the transparent sheet and glass beads, said glass beads having a diameter not in excess of 10 mils and being distributed within said discrete groupings in essentially a compact monolayer adjacent to said transparent sheet, and an underlying specular-reflecting layer cupped around said discrete groupings and embossed toward said transparent sheet, said specular-reflecting sheet being adhesively secured to the glass beads at their extremity farthest from said transparent sheet, and being adhesively secured to said transparent sheet in areas between said groupings, said specular-reflecting sheet being further so shaped as to produce a bridging optical effect when said sheeting is viewed from the front face, said bridging optical effect being formed by the bridge of said specular-reflecting sheet between the lowermost extremity of peripheral beads in said groupings and said transparent sheet.

7. A unitary decorative sheet material having a smooth front face and a three-dimensional appearance, comprising a dimensionally-stable weather-resistant transparent front sheet, an underlying flexible and stretchable specular-reflecting sheet, and a pattern of many spaced-apart design elements consisting of discrete compact groupings of small transparent glass beads between said transparent sheet and said specular-reflecting sheet, said transparent glass beads having underlying approximately hemispherical specular-reflecting coatings, said specular-reflecting sheet being stretched about the rear and side portions of said elements toward said transparent sheet and adhesively secured thereto in areas surrounding said elements, whereby said elements are encapsulated between said transparent sheet and said specular-reflecting sheet, the glass beads of said elements being essentially in tangential contact with the rear surface of said transparent sheet and having an adjacent field of air about interfacial tangential contacts between the transparent sheet and glass beads.

8. A decorative sheet material comprising a dimensionally-stable weather-resistant transparent front sheet behind which a plurality of discrete compact groupings of small glass beads are located, the beads of said groupings being essentially in tangential contact with the rear surface of said front sheet, and an underlying flexible sheet extending about the rear portion of said groupings and hermetically sealed to the transparent front sheet in areas between said groupings to form a series of pockets of said beads in said sheet material, the beads in said groupings having an adjacent field of air about points of contact with the rear surface of said transparent front sheet.

9. A decorative sheet material comprising a dimensionally-stable weather-resistant transparent front sheet, an underlying flexible and stretchable sheet, and a pattern of a plurality of discrete compact groupings of small glass beads between the two sheets with the underlying flexible and stretchable sheet extending about the rear portion of the groupings and secured to the transparent sheet in areas between said groupings, the groupings being encapsulated between the two sheets with the glass beads essentially in contact with the rear surface of the transparent sheet and with an adjacent field of air about the points of contact.

10. A unitary decorative sheet material comprising a dimensionally-stable weather-resistant transparent front sheet of essentially uniform thickness and having a smooth polishable front face, an underlying flexible and stretchable specular-reflecting sheet, and a pattern of many spaced-apart design elements consisting of a discrete compact groupings of small transparent glass beads with underlying approximately-hemispherical specular-reflecting coatings between said transparent front sheet and said specular-reflecting sheet, said specular-reflecting sheet being stretched about the rear and side portions of said design elements toward said transparent front sheet and adhesively secured thereto in areas surrounding said elements, whereby said design elements are encapsulated between said transparent front sheet and said specular-reflecting sheet with the glass beads of said design elements having an adjacent field of air about those interfacial tangential contacts between said glass beads and said transparent front sheet.

References Cited in the file of this patent

UNITED STATES PATENTS

| | | |
|---|---|---|
| 625,464 | Pfister | May 23, 1899 |
| 1,580,921 | Sherer | Apr. 13, 1926 |
| 2,379,741 | Palmquist | July 3, 1945 |
| 2,679,887 | Doyle | June 1, 1954 |
| 2,880,542 | Butterweich | Apr. 7, 1959 |
| 2,948,191 | Hodgson et al. | Aug. 9, 1960 |